(12) United States Patent
Fang et al.

(10) Patent No.: US 10,739,015 B2
(45) Date of Patent: Aug. 11, 2020

(54) REAL-TIME COOKING FUME CONCENTRATION MONITORING SYSTEM AND RANGE HOOD APPLYING THE SAME

(71) Applicant: Ningbo Fotile Kitchen Ware Co., Ltd., Ningbo (CN)

(72) Inventors: Xianliang Fang, Ningbo (CN); Lipeng Zhai, Ningbo (CN); Zhongqun Mao, Ningbo (CN); Yongding Zhu, Ningbo (CN)

(73) Assignee: Ninbo Fotile Kitchen Ware Co., Ltd., Ningbo (CN)

( * ) Notice: Subject to any disclaimer, the term of this patent is extended or adjusted under 35 U.S.C. 154(b) by 148 days.

(21) Appl. No.: 16/084,474

(22) PCT Filed: Mar. 2, 2017

(86) PCT No.: PCT/CN2017/000205
§ 371 (c)(1),
(2) Date: Sep. 12, 2018

(87) PCT Pub. No.: WO2017/166890
PCT Pub. Date: Oct. 5, 2017

(65) Prior Publication Data
US 2019/0072282 A1 Mar. 7, 2019

(30) Foreign Application Priority Data
Mar. 29, 2016 (CN) .......................... 2016 1 0186269

(51) Int. Cl.
*F24C 15/20* (2006.01)
*G01N 21/53* (2006.01)

(52) U.S. Cl.
CPC ...... *F24C 15/2021* (2013.01); *F24C 15/2042* (2013.01); *G01N 21/53* (2013.01)

(58) Field of Classification Search
CPC .......................... F24C 15/2021; F24C 15/2042
See application file for complete search history.

(56) References Cited

U.S. PATENT DOCUMENTS

| 2008/0246623 A1* | 10/2008 | Nagashima | G01N 21/21 340/630 |
| 2012/0298872 A1* | 11/2012 | Tang | H05K 1/184 250/353 |
| 2012/0315666 A1* | 12/2012 | Fujioka | G01N 15/0612 435/39 |

(Continued)

*Primary Examiner* — Jason Lau
(74) *Attorney, Agent, or Firm* — Wang Law Firm, Inc.

(57) ABSTRACT

A real-time fume concentration monitoring system includes an electrical box having a closed internal space, wherein a divider is disposed within the electrical box so that the internal space of the electrical box is divided into a first chamber and a second chamber; a signal emitting unit is disposed within the first chamber, and a signal receiving unit is disposed within the second chamber; a portion of the electrical box corresponding to a signal emitting portion of the signal emitting unit and signal receiving unit is a light-transmitting region; a signal output terminal of the signal receiving unit is connected to a data processing unit. By detecting the fume concentration in a contactless manner, power consumption is low, the energy efficiency demand for the whole machine in the standby state is satisfied, and the signal detection sensitivity is high.

7 Claims, 4 Drawing Sheets

(56) References Cited

U.S. PATENT DOCUMENTS

2013/0087134 A1* 4/2013 Mikulec .............. F24C 15/2021
126/299 D
2013/0255661 A1* 10/2013 Yamanaka .......... F24C 15/2021
126/299 D

* cited by examiner

REAL-TIME COOKING FUME CONCENTRATION MONITORING SYSTEM AND RANGE HOOD APPLYING THE SAME

RELATE APPLICATIONS

This application is a national phase entrance of and claims benefit to PCT Application for a real-time fume concentration monitoring system and a range hood using the same, PCT/CN2017/000205, filed on Mar. 2, 2017, which claims benefit to Chinese Patent Applications 201610186269.2, filed on Mar. 29, 2016. The specifications of both applications are incorporated here by this reference.

FIELD OF THE INVENTION

The present invention relates to the technical field of range hoods, and in particular to a real-time fume concentration monitoring system and a range hood using the same.

DESCRIPTION OF THE PRIOR ART

The rotation of an existing fan for range hoods usually has several levels. A user manually selects a desired level according to actual needs. After a level is selected, the fan operates at a rotation set according to this level until the fan is switched to another level or closed. In this manual control mode, it is very difficult to intelligently and efficiently control the fume concentration in a kitchen. In order to effectively improve the intelligence of the range hood, the fume concentration is estimated by setting detection units and using temperature, humidity or sound detection sensors and detection devices in some manufacturing factories. By this solution, the cost is high, the reflection of the on-site data has a large deviation, and the environment has great influence on the whole detection device. In another method, the fan is linked with a cooking utensil, and the rotation of the fan is adjusted by detecting the thermal power of the cooking utensil. However, the thermal power of the cooking utensil cannot accurately reflect the amount of the generated fume. At present, the fume detection technologies in the market are electrochemical or photoelectrical contact methods. In these methods, the detection components are easily covered by fume, so these detection components have poor detection accuracy and short service life and are difficultly applied in places with a high fume concentration, such as kitchens.

SUMMARY OF THE INVENTION

A first technical problem to be solved by the present invention is, in view of the prior art, to provide a non-contact real-time fume concentration monitoring system having a simple structure and accurate measurement.

A second technical problem to be solved by the present invention is to provide a range hood, which is simple in structure and accurate in control and can automatically and dynamically adjust the rotation of a fan according to the real-time fume concentration. In order to solve the first technical problem, the real-time fume concentration monitoring system, comprises an electrical box having a closed internal space, wherein a divider is disposed within the electrical box so that the internal space of the electrical box is divided into a first chamber and a second chamber, the first chamber does not communicate with the second chamber; a signal emitting unit for emitting a pulse light signal is disposed within the first chamber, and at least a portion of the electrical box corresponding to a signal emitting portion of the signal emitting unit is a light-transmitting region; a signal receiving unit for receiving the pulse light signal emitted by the signal emitting unit is disposed within the second chamber, and at least a portion of the electrical box corresponding to a signal receiving portion of the signal receiving unit is a light-transmitting region; and, a signal output terminal of the signal receiving unit is connected to a data processing unit capable of converting the pulse light signal received by the signal receiving unit into a fume concentration signal according to an intensity of the pulse light signal received.

Preferably, an L-shaped shutter is disposed within the second chamber to form a dark region within the second chamber, and a pulse light signal compensation unit is disposed within the dark region. The signal emitting unit emits a pulse light signal, the pulse light signal passes through the light-transmitting region of the electrical box and is then refracted by fume, and the refracted light signal is received by the signal receiving unit. When the signal emitting unit is in a non-emission period, the signal receiving unit can receive a compensating light signal emitted by the pulse light signal compensation unit, so that the signal reception by the signal receiving unit is kept stable.

Preferably, a non-reflective coating incapable of reflecting the pulse light signal emitted by the signal emitting unit is applied on both sides of the divider. In this way, both sides of the divider will not reflect the light signal.

Preferably, the electrical box comprises a box body having an opening and a transparent cover plate covering the opening of the box body; a non-reflective coating incapable of reflecting the pulse light signal emitted by the signal emitting unit is applied on an inner wall of the box body; a first light-transmitting region fitted within the transparent cover plate that covers the first chamber and corresponds to the signal emitting unit; a second light-transmitting region fitted within the transparent cover plate that covers the second chamber and corresponds to the signal receiving unit; and, a non-reflective coating incapable of reflecting the pulse light signal emitted by the signal emitting unit is applied to the entire transparent cover plate except for the first light-transmitting region and the second light-transmitting region.

Preferably, the transparent cover plate has a thickness that is less than or equal to 8 mm, and each of the first light-transmitting region and the second light-transmitting region has a diameter that is between 5 mm to 15 mm. The signal emitting unit is located in an axial center of the first light-transmitting region, and the signal receiving unit is located in an axial center of the second light-transmitting region.

Preferably, the first light-transmitting region comprises a lens and the second light-transmitting region comprises a lens.

Preferably, the data processing unit is disposed within the second chamber, and the electric box further comprises a through hole for a signal cable to pass through, the signal cable is connected to the data processing unit.

Preferably, both the pulse light signal emitted by the signal emitting unit and a pulse light signal emitted by the pulse light signal compensation unit are invisible light signals, so the external light is effectively prevented from interfering with the fume detection performed by the system.

In order to solve the second technical problem, the range hood, comprises a housing, a fan disposed within the housing and a speed control circuit capable of controlling the rotation of the fan, wherein the fan is in communication to a wind outlet through an exhaust duct; a real-time fume concentration monitoring system of the above structure is disposed on the range hood; an output terminal of a data processing unit in the real-time fume concentration monitoring system is connected to an input terminal of the speed control circuit, and an output terminal of the speed control circuit is connected to the fan; the speed control circuit dynamically adjusts the rotation of the fan according to an fume concentration signal detected in real time by the real-time fume concentration monitoring system; and, the rotation of the fan will be higher if a high fume concentration is detected, and the rotation of the fan will be lower if a low fume concentration is detected.

Preferably, an fume barrier is disposed at an inlet of the housing, and the real-time fume concentration monitoring system is located on a rear side of the fume barrier. Thus, the interference with the sensitivity from the high-concentration fume can be effectively avoided.

Compared with the prior art, the present invention has the following advantages: by detecting the fume concentration in a contactless manner, the power consumption is low, it is advantageous for satisfying the energy efficiency demand for the whole machine in the standby state, and the signal detection sensitivity is high. A light signal emitted by the signal emitting unit passes through a light-transmitting region of the electrical box and is then reflected by surfaces of fume particles. The reflected light signal passes through the light-transmitting region of the electrical box again and is then received by the signal receiving unit. The signal receiving device converts a weak light signal into a quantifiable electrical signal, and the quantifiable electrical signal is processed by the data processing unit to obtain a control signal source capable of quantifying the fume concentration in real time. The control signal source is connected to the speed control circuit of the range hood, and the speed control circuit adjusts the rotation of the fan in real time so as to realize the automatic control on the rotation of the fan of the range hood.

DETAILED DESCRIPTION OF THE PREFERRED EMBODIMENT

Figure 1:
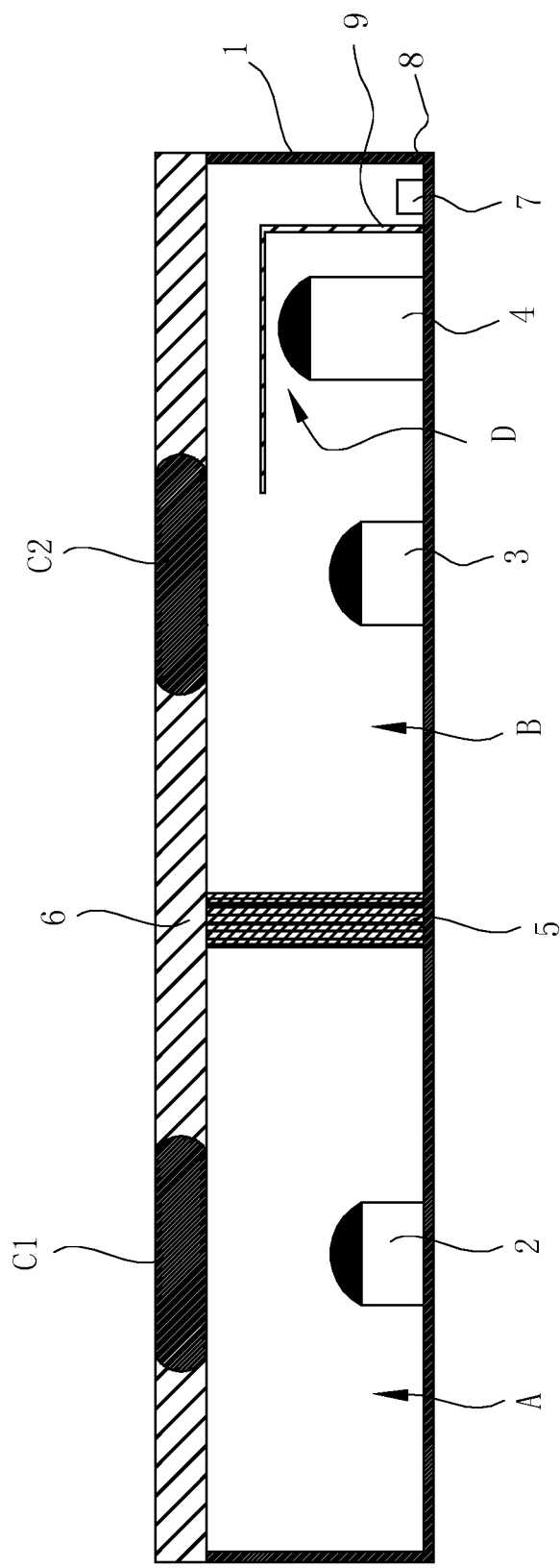
FIG. 1 is a schematic view of a real-time fume concentration monitoring system according to a first embodiment of the present invention.
Figure 2:
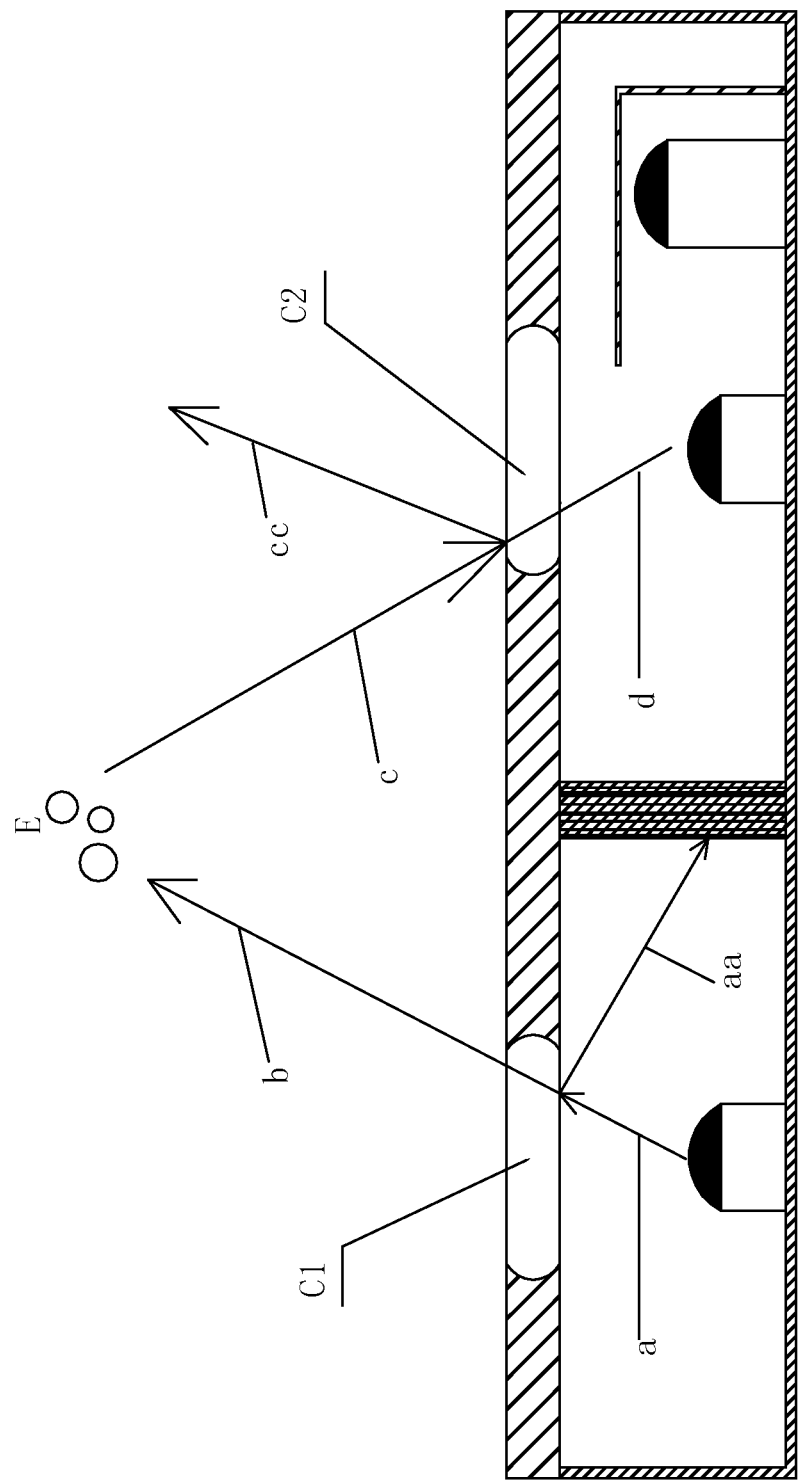
FIG. 2 a schematic view of a light signal in the real-time fume concentration monitoring system.
Figure 3:
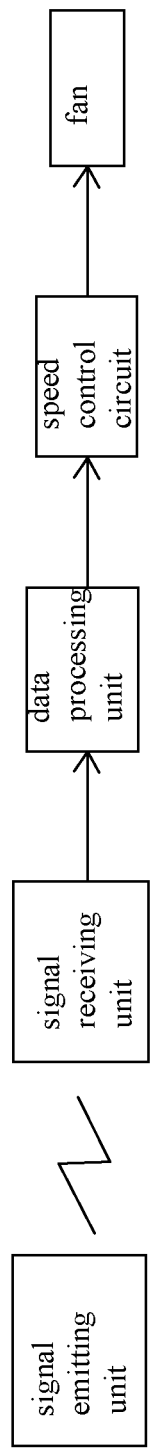
FIG. 3 is a block diagram showing the electric power control of a fan of a range hood.

To enable a further understanding of the present invention content of the invention herein, refer to the detailed description of the invention and the accompanying drawings below:

FIG. 1-FIG. 3 show a preferred embodiment of the real-time fume concentration monitoring system of the present invention. The monitoring system comprises an electrical box having a closed internal space. The electrical box comprises a box body 1 having an opening and a transparent cover plate 6 covering the opening of the box body 1.

A divider 5 is disposed within the electrical box, so that the internal space of the electrical box is divided into a first chamber A and a second chamber B; the first chamber does not communicate with the second chamber. A signal emitting unit 2 for emitting a pulse light signal is disposed within the first chamber A.

A signal receiving unit 3 for receiving the pulse light signal emitted by the signal emitting unit 2 is disposed within the second chamber B.

A signal output terminal of the signal receiving unit 3 is connected to a data processing unit 7 capable of converting the pulse light signal received by the signal receiving unit 3 into a fume concentration signal according to an intensity of the pulse light signal received.

As a conversion method used during the conversion from the intensity of the light signal into a fume concentration signal by the data processing unit 7, a conventional method may be used. The data processing unit 7 assumes that there is a linear correspondence between the intensity of the light signal and the fume concentration, for example, the fume=k*the intensity of the light signal, where k is a constant. Obviously, if the intensity of the light signal is higher, the fume concentration is higher; and, if the intensity of the light signal is lower, the fume concentration is lower.

A non-reflective coating incapable of reflecting the pulse light signal emitted by the signal emitting unit 2 is applied onto an inner wall of the box body 1, so that the inner wall of the box body 1 does not reflect light. A first light-transmitting region C1 fitted within the transparent cover plate 6 that covers the first chamber A and corresponds to the signal emitting unit 2, and a second light-transmitting region C2 fitted within the transparent cover plate 6 that covers the second chamber B and corresponds to the signal receiving unit 3. The non-reflective coating incapable of reflecting the pulse light signal emitted by the signal emitting unit 2 is applied to the entire transparent cover 6 except for the first light-transmitting region C1 and the second light-transmitting region C2. A non-reflective coating incapable of reflecting the pulse light signal emitted by the signal emitting unit 2 is applied onto both sides of the divider 5.

An L-shaped shutter 9 is disposed within the second chamber B to form a dark region D is formed within the second chamber B and a pulse light signal compensation unit 4 is disposed within the dark region D.

The transparent cover plate 6 has a thickness that is less than or equal to 8 mm, and each of the first light-transmittable region C1 and the second light-transmittable region C2 has a diameter of that is between 5 mm to 15 mm.

The signal emitting unit 2 is located in an axial center of the first light-transmitting region C1, and the signal receiving unit 3 is located in an axial center of the second light-transmitting region C2.

The data processing unit 7 is disposed within the second chamber B, and the electric box further comprises a through hole 8 for a signal cable to pass through, the signal cable is connected to the data processing unit 7.

Both the pulse light signal emitted by the signal emitting unit 2 and a pulse light signal emitted by the pulse light signal compensation unit 4 are invisible light signals.

In order to increase the intensity of the signal from the real-time fume concentration monitoring system, the first light-transmitting region C1 and/or the second light-transmitting region C2 comprises a lens.

As shown in FIG. 2, an invisible light signal a emitted by the signal emitting unit 2 passes through the first light-transmitting region C1 to a fume concentration detection region E to obtain a signal b, and the signal aa reflected by the transparent cover plate 6 is absorbed by the inner wall of the electrical box. The signal b is reflected by surfaces of fume particles, and the reflected signal c reaches the signal receiving unit within the second chamber B after passing through the second light-transmitting region C2 or the optical lens. Part of the light signal c is reflected to the space by the transparent cover plate 6 to obtain a reactive signal cc. The signal receiving unit 3 converts the valid light signal d into a quantifiable electrical signal.

Figure 4:
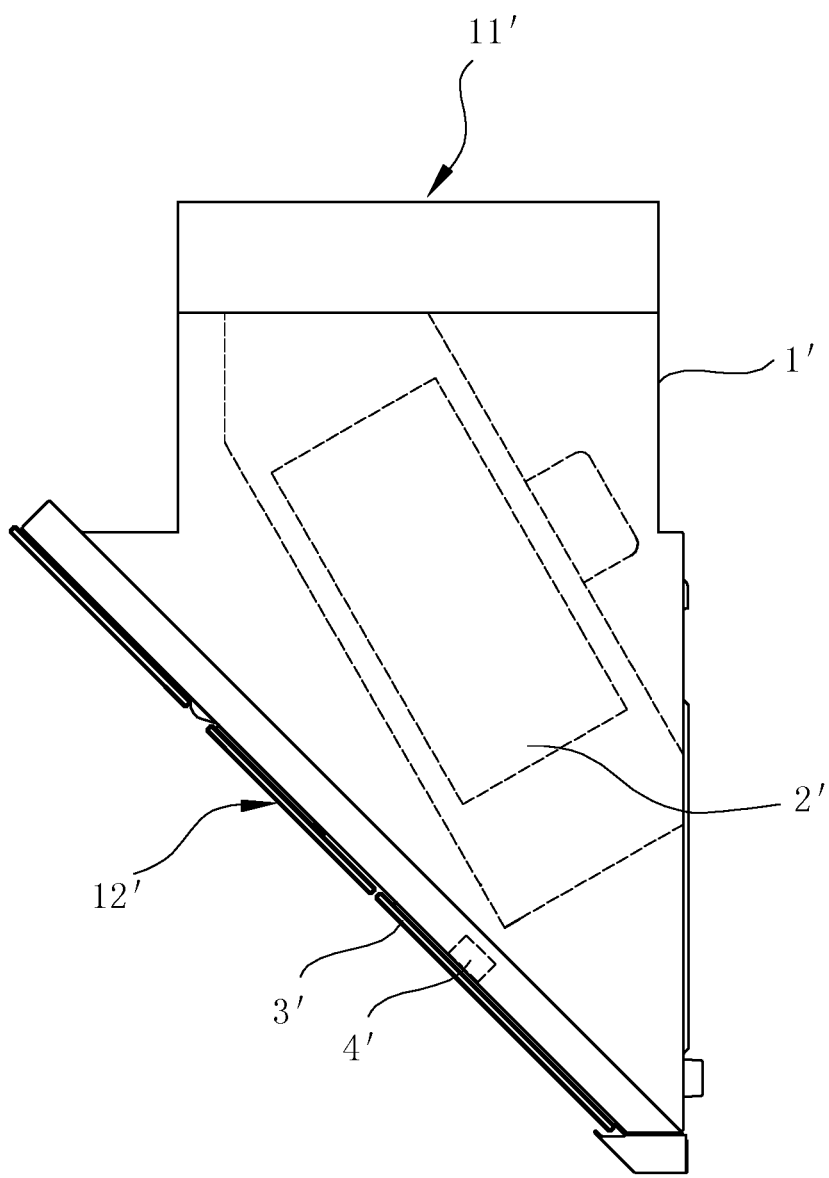
FIG. 4 is a side view of a range hood according to a second embodiment of the present invention.

FIG. 4 shows a second preferred embodiment of a range hood of the present invention. The range hood comprises a housing 1' having a wind outlet 11' and an inlet 12', a fan 2' disposed within the housing 1', and a speed control circuit (not shown) capable of controlling the rotation of the fan 2'. The fan 2' is in communication to the wind outlet 11' through an exhaust duct. A fume barrier 3' is disposed at the inlet 12' of the housing 1'. A real-time fume concentration monitoring system 4' of the above structure is located on a rear side of the fume barrier 3'.

An output terminal of a data processing unit in the real-time fume concentration monitoring system 4' is connected to an input terminal of the speed control circuit, and an output terminal of the speed control circuit is connected to the fan 2'. The speed control circuit dynamically adjusts the rotation of the fan 2' according to a fume concentration signal detected in real time by the real-time fume concentration monitoring system 4'. The rotation of the fan 2' will be higher if a high fume concentration is detected, and the rotation of the fan 2' will be lower if a low fume concentration is detected.

The invention claimed is:

1. A real-time fume concentration monitoring system, comprising an electrical box having a closed internal space, wherein
   a divider is disposed within the electrical box so that the internal space of the electrical box is divided into a first chamber and a second chamber, the first chamber does not communicate with the second chamber;
   a signal emitting unit for emitting a pulse light signal is disposed within the first chamber, and at least a portion of the electrical box corresponding to a signal emitting portion of the signal emitting unit is a light-transmitting region;
   a signal receiving unit for receiving the pulse light signal emitted by the signal emitting unit is disposed within the second chamber, and at least a portion of the electrical box corresponding to a signal receiving portion of the signal receiving unit is a light-transmitting region;
   a signal output terminal of the signal receiving unit is connected to a data processing unit capable of converting the pulse light signal received by the signal receiving unit into a fume concentration signal according to an intensity of the pulse light signal received; and
   an L-shaped shutter is disposed within the second chamber to form a dark region within the second chamber, and a pulse light signal compensation unit is disposed within the dark region.

2. The system of claim 1, wherein a non-reflective coating incapable of reflecting the pulse light signal emitted by the signal emitting unit is applied onto both sides of the divider.

3. The system of claim 1, wherein
   the electrical box further comprises a box body having an opening and a transparent cover plate covering the opening of the box body;
   a non-reflective coating incapable of reflecting the pulse light signal emitted by the signal emitting unit is applied onto an inner wall of the box body;
   a first light-transmitting region fitted within the transparent cover plate that covers the first chamber and corresponds to the signal emitting unit;
   a second light-transmitting region fitted within the transparent cover plate that covers the second chamber and corresponds to the signal receiving unit; and,
   the non-reflective coating incapable of reflecting the pulse light signal emitted by the signal emitting unit is applied to the entire transparent cover plate except for the first light-transmitting region and the second light-transmitting region.

4. The system of claim 3, wherein
   the transparent cover plate has a thickness that is less than or equal to 8 mm, and each of the first light-transmitting region and the second light-transmitting region has a diameter that is between 5 mm to 15 mm;
   the signal emitting unit is located in an axial center of the first light-transmitting region, and the signal receiving unit is located in an axial center of the second light-transmitting region.

5. The system of claim 1, wherein the first light-transmitting region further comprises a lens and the second light-transmitting region further comprises a lens.

6. The system of claim 1, wherein
   the data processing unit is disposed within the second chamber; and,
   the electric box further comprises a through hole for a signal cable to pass through, the signal cable is connected to the data processing unit.

7. The system of claim 1, wherein both the pulse light signal emitted by the signal emitting unit and a pulse light signal emitted by the pulse light signal compensation unit are invisible light signals.

* * * * *